Dec. 3, 1963

W. E. LEWIS ETAL 3,112,575

APPARATUS FOR HANDLING PURSE SEINES

Filed June 1, 1960

INVENTOR
Wallace E. Lewis &
Hanna R. Humphreys, Jr.

BY J. Hanson Boyden,

ATTORNEY

Dec. 3, 1963　　　W. E. LEWIS ETAL　　　3,112,575
APPARATUS FOR HANDLING PURSE SEINES
Filed June 1, 1960　　　　　　　　　　　　　4 Sheets-Sheet 2

INVENTOR
Wallace E. Lewis &
Hanna R. Humpheys, Jr.

ATTORNEY

INVENTOR
Wallace E. Lewis &
Hanna R. Humphreys, Jr.

BY J. Hanson Boyden

ATTORNEY

Dec. 3, 1963    W. E. LEWIS ETAL    3,112,575
APPARATUS FOR HANDLING PURSE SEINES
Filed June 1, 1960    4 Sheets-Sheet 4

INVENTOR
Wallace E. Lewis &
Hanna R. Humphreys, Jr.

BY *J. Hanson Boyden*

ATTORNEY

United States Patent Office 3,112,575
Patented Dec. 3, 1963

3,112,575
APPARATUS FOR HANDLING PURSE SEINES
Wallace E. Lewis, Beaufort, N.C., and Hanna R. Humphreys, Jr., White Stone, Va. (both % Standard Products Co., White Stone, Va.)
Filed June 1, 1960, Ser. No. 33,316
3 Claims. (Cl. 43—8)

This invention relates to equipment employed in the commercial fishing industry, and more particularly to apparatus for handling purse seines or nets.

With the advent of nylon, the industry was quick to adopt nylon pursing lines, and the customary method of pulling in such lines was by means of a power driven cat head or winch head of the general type shown, for example, in expired Patent No. 1,216,530, Williams, issued February 20, 1917.

Several turns of the line were passed around such cat head, with a man holding the line to control the tension, the line being held taut when it was desired to pull it in rapidly, and being slackened when it was desired to slow it down or stop it. It was found, however, that slippage of the line on the cat head, when slackened, generated such friction as to seriously burn the line, so that it was practically impossible to use nylon lines with such equipment.

Moreover, with the old arrangement, the line, after coming off the cat head or winch head, had to be wound on a spool or reel by another man. Thus two men were required to operate each line.

One general object of the present invention is to provide apparatus for satisfactory handling a nylon pursing line which will not burn the line.

Another general object is to devise equipment of such character that only one man is required to control and operate each line, thus greatly reducing the cost of labor.

To these ends, the invention contemplates doing away with cat heads or the like, and using instead a winding and storage drum or winch driven by a rotary hydraulic motor, supplied with motive fluid by a pump operated from the boat engine, such motor being reversible, and equipped with a control valve by means of which the motor may be run in either direction to cause the drum to either wind up or pay out the line, or may be locked against movement, so as to hold the line stationary.

A specific object of the invention is to devise an improved brake and clutch arrangement for such a winding drum.

Another specific object is to provide an improved winch having a drum made up of a relatively large and a relatively small section, together with means for shifting the line from one section to the other, whereby the line may be pulled in rapidly at first by means of the large drum, and then pulled more slowly and with much greater power, by means of the small drum.

With the above and other objects in view, and to improve generally on the details of such apparatus, the invention consists in the construction, arrangement and combination of parts hereinafter described and claimed, and illustrated in the accompanying drawings, forming part of this specification, and in which:

Figure 10:
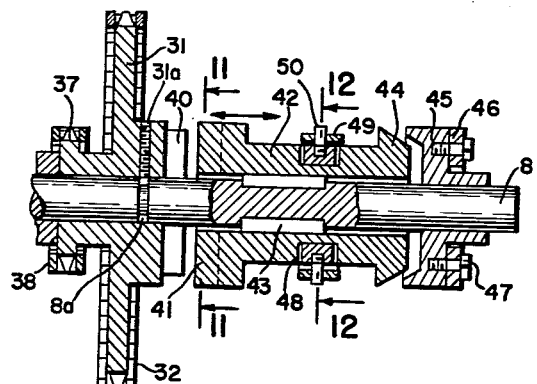
FIG. 10 is a longitudinal section on a still further enlarged scale substantially on the line 10—10 of FIG. 4 through our improved clutch and brake mechanism.
Figure 11:
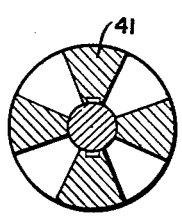
Figure 12:
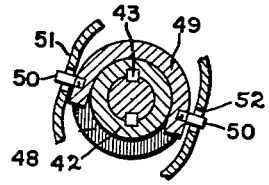
Figure 13:
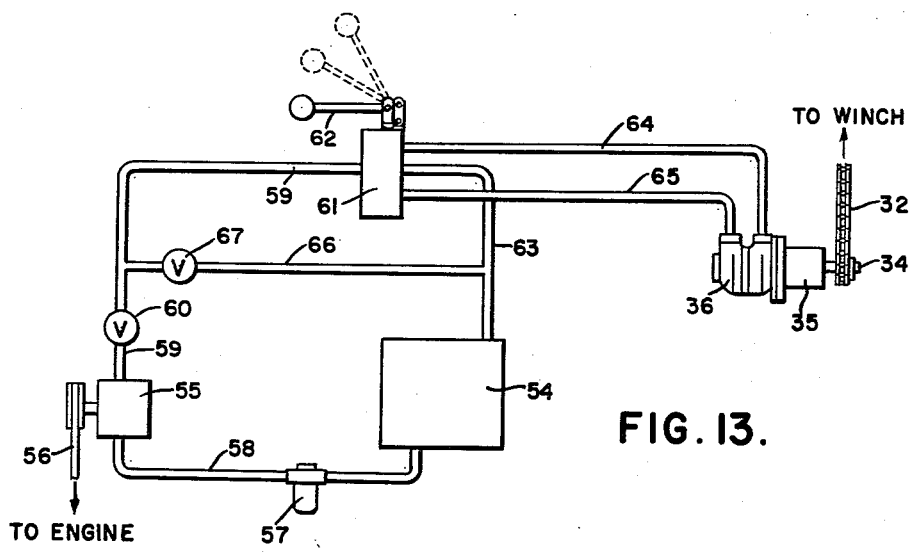

FIGS. 11 and 12 are transverse sections, respectively, on the lines 11—11 and 12—12 of FIG. 10, looking in the direction of the arrows; and FIG. 13 is a diagrammatic view illustrating the improved hydraulic system which we employ.

Figure 1:
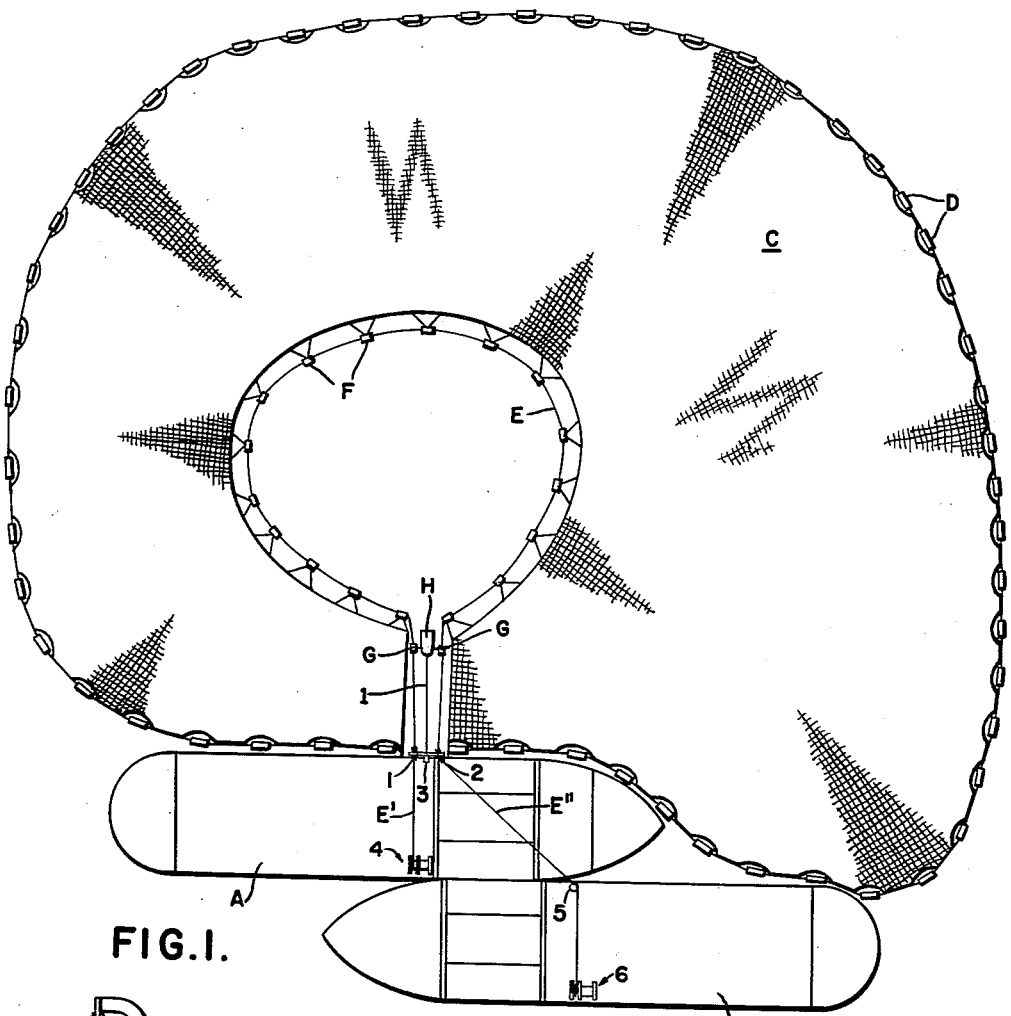
FIG. 1 is a plan view of a purse net or seine in operative position with the two boats by means of which it is manipulated.

Referring to the drawings in detail, and more particularly first to FIG. 1, we have illustrated two similar power-driven fishing boats A and B, shown in pursing position alongside and parallel with each other and alongside the purse net C. This net has a series of floats D along its upper edge and a series of rings or guides F around its lower edge, through which rings or guides passes the pursing line E.

The two ends of this line, designated E' and E", respectively, pass through guide pulleys G carried by a heavy weight H suspended by a line I from the boat A.

Figure 2:
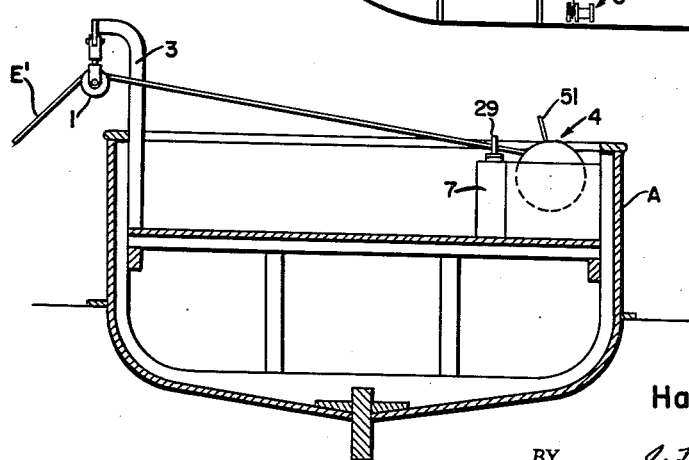
FIG. 2 is a cross-section on an enlarged scale through one of the boats showing the winding drum and guide pulley.

Referring now to FIG. 2, as well as FIG. 1, we have illustrated a pair of swivel blocks or pulleys 1 and 2 carried at the upper end of a crane 3 mounted at one side of the boat A. The end E' of the pursing line passes over the block of pulley 1 to a winch or winding and storage drum designated in its entirety by the numeral 4 and mounted in the boat at the side thereof opposite the crane.

The other end E" of the pursing line passes around the block or pulley 2 and thence around a guide pulley 5 mounted on boat B, from which it passes to another winch or winding and storage drum 6 mounted at the opposite side of the boat B.

Figure 3:
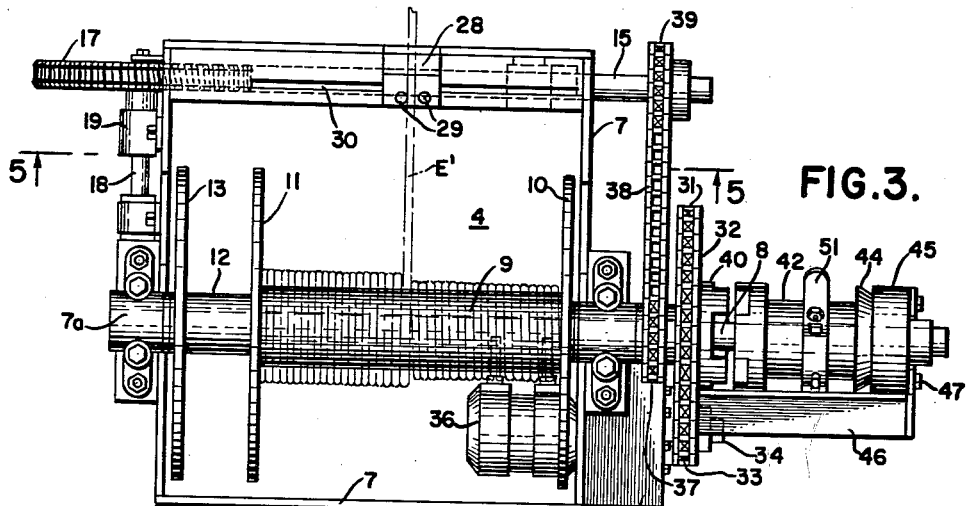
FIG. 3 is a plan view on a still further enlarged scale of our improved winding drum or winch, the purse line being shown in broken lines.
Figure 4:
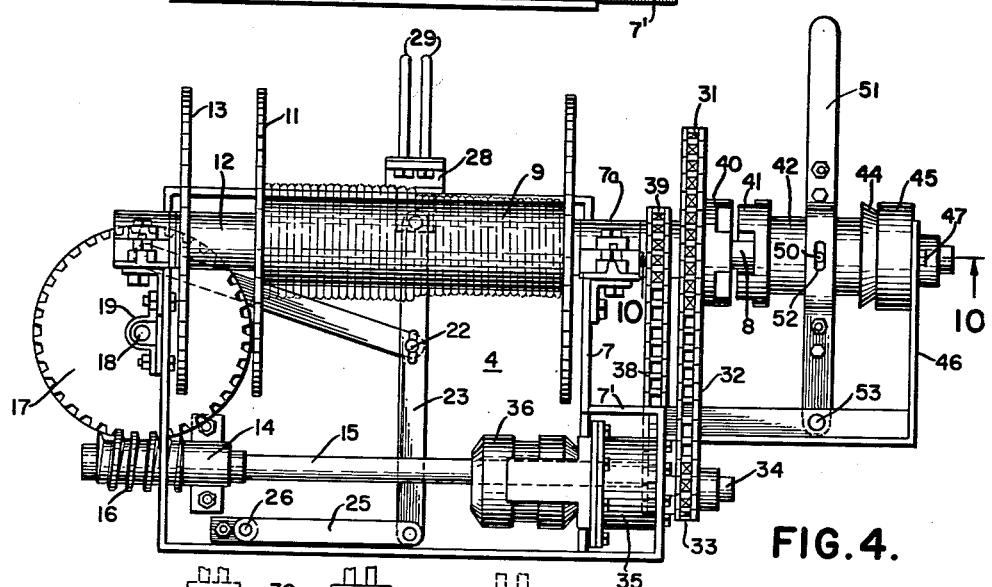
FIG. 4 is a side elevation thereof, the purse line being indicated in broken lines.
Figure 5:
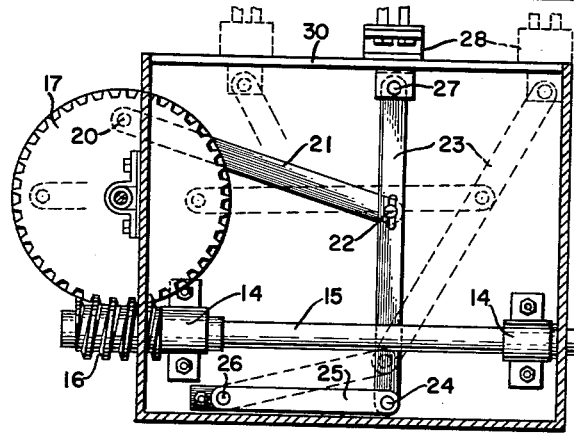
FIG. 5 is a vertical section substantially on the line 5—5 of FIG. 3, looking in the direction of the arrows.

One of our improved winches or winding drums such as those illustrated at 4 and 6 in FIG. 1 is shown in detail in FIGS. 3–12. This improved winch or winding mechanism comprises a suitable frame 7 which may conveniently be formed from heavy steel plate welded together. Journaled in bearings 7ª carried by this frame is a shaft 8 on which is fixedly secured our improved winding drum. This drum comprises a section 9 of relatively large diameter and length and a section 12 of relatively small diameter and length, in axial alinement, as shown in FIGS. 3 and 4 radial flanges 10 and 13 being provided at the respective ends of the two sections, and the sections being separated by a radial flange 11, all of these flanges being preferably of the same diameter.

Journaled in bearings 14 mounted on the frame 7 is a shaft 15, carrying at one end a worm 16 meshing with a worm wheel 17 mounted on a shaft 18 journaled in bearings 19 secured to the frame 7.

A pitman rod 21 is pivotally connected to the worm wheel 17 at 20 and at its opposite end is pivotally connected at 22 with a vertical lever 23 pivoted at its lower end at 24 to one end of a link 25, pivotally secured at 26 to a fixed support. The upper end of the lever 23 is pivotally connected to a slide 28 carrying a pair of upright guide pins 29. This slide 28 rides on a part of the frame 7 and has a portion extending downwardly through an elongated slot 30 (see FIG. 3).

This slide 28, pins 29 and associated parts driven by the worm 16 constitute a traverse mechanism which serves to guide the pursuing line, secured to the large drum, back and forth along the same so as to cause it to wind evenly thereon as indicated in FIG. 3.

Freely journaled on the shaft 8 is a sprocket wheel 31 over which passes a sprocket chain 32 around a sprocket pinion 33 secured to a shaft 34 which is the output shaft of a gear reduction box 35 enclosed within a portion 7' of the frame. The gearing in this box 35 is driven by a reversible hydraulic motor 36, as shown in FIGS. 3, 4 and 13. This constitutes the main drive for the winch.

Rigidly connected with the sprocket wheel 31 and preferably cast integral therewith is another sprocket wheel 37 (see FIG. 10), and around this sprocket wheel 37 passes a sprocket chain 38 over a sprocket pinion 39 secured on the shaft 15. Thus, when the pinion 31 rotates, the shaft 15 and worm 16 are continuously driven. Although the sprocket wheels 31 and 37 rotate freely on the shaft 8, means are provided for preventing them from moving axially along the shaft. This can be accomplished by forming a groove 8ª in the shaft and providing a set screw 31ª in the hub of sprocket wheel 31, the point of screw 31ª in the hub of sprocket wheel 31, the point of which works freely in this groove, as shown in FIG. 10.

Referring now more particularly to FIGS. 3, 4 and 10–12, we provide on the face of sprocket wheel 31 opposite to the sprocket wheel 37 a square tooth clutch member 40. A similar clutch member 41 is formed on the end of a sleeve 42 slidable on the shaft 8 but keyed thereto as by means of keys 43. At the end of the sleeve 42 opposite the clutch member 41 is formed a brake shoe 44, preferably conical as shown, and this is adapted to cooperate with a fixed brake drum 45 freely mounted on the shaft 8 but rigidly supported by means of bolts 47 on a bracket 46, secured, as by welding, to the frame 7.

In order to shift the sleeve 42 along the shaft 8, we provide it, intermediate with its ends, with an annular groove 48 in which rides an arcuate fork 49 from which project diametrically opposite pins 50. These pins 50 work freely in slots 52 in the bowed middle portion of a lever 51 pivoted to a fixed support at its lower end as indicated at 53.

Referring now to FIG. 13, our improved hydraulic system comprises a tank 54 from which extends a pipe 58, containing a filter 57, to a pump 55 driven by the boat engine, as by means of a belt 56. The pump delivers motive fluid through a pipe 59 in which is interposed a pressure regulating valve 60, and this pipe 59 delivers to a control valve 61 having a three-position manual lever 62. From the control valve 61 extend pipes 64 and 65 to the reversible hydraulic motor 36. A discharge pipe 63 also extends from the control valve 61 to the tank 54, and a by-pass conduit 66, containing a safety valve 67 connects the pipe 59 with the pipe 63.

In operation, there is only one man required in each boat to control the respective winches.

The reversible hydraulic motor 26 is advantageously of the vane type and is so constructed that it may be caused to rotate in one direction or the other by supplying motive fluid either through pipe 64 or pipe 65, the fluid exhausting through pipe 63 back to the tank. The delivery of motive fluid through the pipes 64 and 65 is selectively controlled by moving the handle or lever 62 to one or the other of its extreme positions. When this handle or lever is moved to its intermediate position, it completely shuts off the flow of motive fluid to the motor and confines the fluid within the motor and pipes 64 and 65. When fluid is thus confined within the motor, the motor is held or locked stationary and cannot rotate.

Hydraulic motors and control valves of the type described are commercially available either from Vickers, Inc. or from the Hydreco Division of the New York Air Brake Co., the motors of the latter company being sold under the trade name "DUDCO."

It will be understood that with our improved arrangement the two ends of the pursing line can be pulled in independently, or they may both be pulled in together by simultaneously operating the two winches. When it is desired to pull in the pursing line, the control lever 62 is thrown to one of its extreme positions so as to drive the hydraulic motor 36 in the appropriate direction to wind the line upon the drum 9. At the same time, the sleeve 42 is shifted to the left so as to engage the clutch members 40 and 41, thus causing the motor 36 to drive the shaft 8 and the winding drum through the reduction gearing 35, sprocket chain 32 and sprocket wheel 31.

At the same time, the sprocket chain 38 rotates the shaft 15, thus operating the traverse mechanism 28, 29 and causing the line to be guided back and forth so as to be wound evenly on the large drum section 9. At this stage, the line is being pulled in at a maximum speed since, during the initial stages a relatively small amount of power is required.

Figures 6, 7:
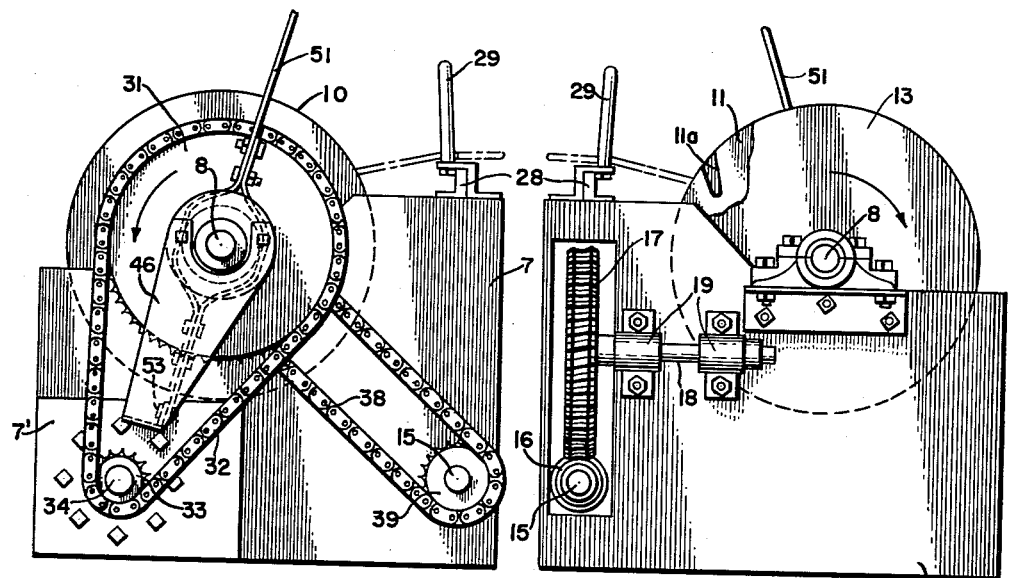
FIGS. 6 and 7 are elevational views of the opposite ends of the winch shown in FIGS. 3 and 4.
Figure 9:
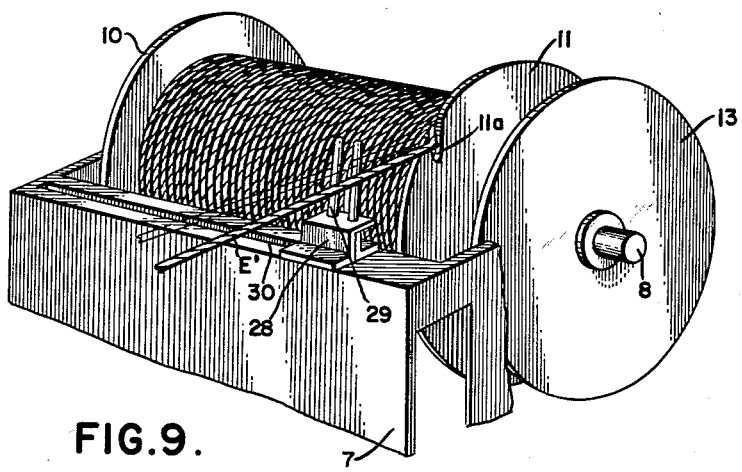
FIG. 9 is a perspective view of the winding drum or winch, showing the traverse mechanism, all gearing being omitted for the sake of clearness.

By reference to FIGS. 7 and 9, it will be seen that a notch 11ª is formed in the edge of the disc or flange 11 separating the large and small sections of the winding drum. When the large section 9 of the drum has become nearly filled with line and more power is required to complete the hauling in of the line, the line is knocked out of the traverse guides 29 and is then caught in the notch 11 and automatically transferred to the smaller section 12 of the drum. This immediately greatly increases the power exerted on the line, and the line is pulled in much more slowly. The result is similar to that achieved by shifting from high to low gear in a motor vehicle.

Figure 8:
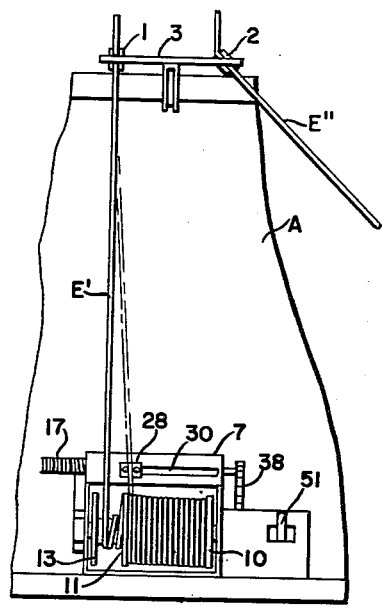
FIG. 8 is an enlarged detail of a portion of one of the boats and winding mechanism shown in FIG. 1.

However, in order to cause the line to snap automatically onto the small section of the drum when released from the traverse mechanism, it is desirable to so place the guide pulleys or blocks 1 and 5 that the line is delivered directly to the small drum section as indicated in FIG. 1 and as more clearly illustrated in FIG. 8. In other words, the traverse mechanism 28 deflects the line laterally, as indicated in broken lines in FIG. 8, so as to cause it to be wound upon the large section of the drum, and therefore, when the line is released from the traverse mechanism it tends to automatically assume the position shown in full lines in FIG. 8, this transfer of the line from the large section of the drum to the small section being facilitated by the notch 11ª in the dividing flange 11.

If at any time during the winding operation it is desired to stop the winding and hold the line stationary, all the operator has to do is to throw the control lever 62 from its extreme to its intermediate position, and this results in locking the motor 36 and holding the drum against rotation.

When it is desired to freely release or unroll the line, the lever 51 is shifted so as to disengage the clutch members 40 and 41. This leaves the winding drum entirely free to rotate, independently of the motor and this free rotation may be controlled or stopped by means of the brake 44, 45, simply by shifting the sleeve 42 towards the right with more or less force, as desired.

It will be noted by reference to FIGS. 1 and 8 that the end E" of the pursing line which is being wound upon the winch 6 in boat B extends across boat A, from the crane 3 to the guide pulley 5, and it will be further noted that the bows of the two boats point in opposite directions.

It will thus be seen that we have provided improved apparatus for handling a pursing net or seine, such apparatus being so designed that it can be completely controlled by two boats with one man in each boat. It will also be particularly noted that with our improved winding arrangement there is no slippage of the line and consequently no burning, and it is thought that the many advantages of the invention will be readily appreciated by those familiar with such matters.

What we claim is:

1. Equipment for handling purse seines having a series of floats along the upper edge and a series of line guides along the lower edge, comprising, in combination, a continuous purse line passing through said guides, first and second power operated boats, each having thereon a line winding and storage drum, said first boat, during the pursing operation, bearing against the seine and said second boat bearing against and lying alongside of said first boat, and line guiding means on each boat, one end of said purse line passing through the line guiding means on said first boat and secured to the winding and storage drum on that boat, and the other end of said purse line passing through the line guiding means on both boats and secured to the winding and storage drum on said second boat.

2. Equipment for handling purse nets having a continuous purse line with two ends comprising first and second fishing boats each having an engine, a line winding and storage drum in each boat, a guide pulley on the first boat for delivering one end portion of said line directly to the line winding and storage drum on that boat, and two additional guide pulleys, one on said first boat and one on said second boat, for delivering the other end portion of said line to the winding and storage drum on said second boat, the two boats, when in pursing position, lying side by side, and said other end portion of said pursing line extending across said first boat to the second boat.

3. Equipment for handling purse nets having a continuous purse line with two ends, comprising first and second fishing boats, power means including an engine in each boat, a winding and storage drum in each boat, means whereby each of said winding and storage drums is controllably operated by the power means in its own boat, means on each boat for guiding said purse line, the two ends of said line being secured to the drums in the respective boats, one end of said purse line passing directly from the guiding means on the first boat to the winding and storage drum on that boat, and the other end of said purse line passing through guiding means on the first boat and thence through guiding means on the second boat to the winding and storage drum on that boat, when the two boats are in pursing position, and means for disconnecting each drum from its power means, when desired, so that it may run free, whereby each end of said purse line may be independently wound up or released as required.

References Cited in the file of this patent
UNITED STATES PATENTS

| | | |
|---|---|---|
| 575,360 | Lindsay | Jan. 19, 1897 |
| 672,571 | Savoy | Apr. 23, 1901 |
| 697,151 | Lantz | Apr. 8, 1902 |
| 1,304,302 | Gage | May 20, 1919 |
| 1,621,714 | Dyer et al. | Mar. 22, 1927 |
| 1,688,599 | Sage et al. | Oct. 23, 1928 |
| 1,863,989 | Liisanantti | June 21, 1932 |
| 2,289,387 | Stephens | July 14, 1942 |
| 2,359,211 | Fox | Sept. 26, 1944 |
| 2,570,285 | Sundberg | Oct. 9, 1951 |
| 2,619,322 | Comstock | Nov. 25, 1952 |
| 2,635,428 | Marsh et al. | Apr. 21, 1953 |
| 2,873,948 | Colmer | Feb. 17, 1959 |
| 2,875,546 | Weathersby | Mar. 3, 1959 |